United States Patent
Dadvand et al.

(10) Patent No.: US 10,584,231 B2
(45) Date of Patent: Mar. 10, 2020

(54) MODIFIED NITRIDE PARTICLES, OLIGOMER FUNCTIONALIZED NITRIDE PARTICLES, POLYMER BASED COMPOSITES AND METHODS OF FORMING THEREOF

(71) Applicant: SAINT-GOBAIN CERAMICS & PLASTICS, INC., Worcester, MA (US)

(72) Inventors: Nazila Dadvand, Worcester, MA (US); Nabil Nahas, Boston, MA (US)

(73) Assignee: SAINT-GOBAIN CERAMICS & PLASTICS, INC., Worcester, MA (US)

(*) Notice: Subject to any disclaimer, the term of this patent is extended or adjusted under 35 U.S.C. 154(b) by 0 days.

(21) Appl. No.: 15/392,699

(22) Filed: Dec. 28, 2016

(65) Prior Publication Data

US 2017/0190885 A1    Jul. 6, 2017

Related U.S. Application Data

(60) Provisional application No. 62/273,078, filed on Dec. 30, 2015.

(51) Int. Cl.
| | | |
|---|---|---|
| C08K 9/04 | (2006.01) |
| C09C 1/00 | (2006.01) |
| C08K 3/38 | (2006.01) |
| C09C 3/08 | (2006.01) |

(52) U.S. Cl.
CPC .................. *C08K 9/04* (2013.01); *C08K 3/38* (2013.01); *C09C 1/00* (2013.01); *C09C 3/08* (2013.01); *C08K 2003/385* (2013.01)

(58) Field of Classification Search
CPC .... C08K 9/04; C08K 3/38; C09C 3/08; C09C 1/00
See application file for complete search history.

(56) References Cited

U.S. PATENT DOCUMENTS

| | | |
|---|---|---|
| 4,654,527 A | 3/1987 | Schmitt |
| 5,506,055 A | 4/1996 | Dorfman et al. |
| 5,536,292 A | 7/1996 | Holcombe et al. |
| 5,681,883 A | 10/1997 | Hill et al. |
| 6,160,042 A | 12/2000 | Ishida |
| 6,378,599 B1 | 4/2002 | Schmidt et al. |
| 6,831,031 B2 | 12/2004 | Ishihara |
| 6,913,827 B2 | 7/2005 | George et al. |

(Continued)

FOREIGN PATENT DOCUMENTS

| | | |
|---|---|---|
| CN | 102015913 A | 4/2011 |
| CN | 102516766 A | 6/2012 |

(Continued)

OTHER PUBLICATIONS

International Search Report and Written Opinion for International Patent Application PCT/US2016/068907, dated Apr. 13, 2017, 13 Pages.

(Continued)

*Primary Examiner* — John E Uselding
(74) *Attorney, Agent, or Firm* — Abel Schillinger, LLP; J. Adrian Lawrence

(57) ABSTRACT

A surface modified nitride particle including a nitride particle covalently bonded via a urethane moiety to an aromatic compound. The surface modified nitride particle may further include at least two auxiliary moieties for bonding to oligomers.

15 Claims, 3 Drawing Sheets

(56) References Cited

U.S. PATENT DOCUMENTS

| | | | |
|---|---|---|---|
| 7,445,797 | B2 | 11/2008 | Meneghetti et al. |
| 7,479,516 | B2 | 1/2009 | Chen et al. |
| 7,524,560 | B2 | 4/2009 | Paisner et al. |
| 7,527,859 | B2 | 5/2009 | Zhong et al. |
| 7,920,805 | B2 | 4/2011 | Bellino et al. |
| 8,039,527 | B2 | 10/2011 | Boussaad |
| 8,168,227 | B2 | 5/2012 | Abe et al. |
| 8,258,346 | B2 | 9/2012 | Rajendran |
| 8,288,466 | B2 | 10/2012 | Lin et al. |
| 8,303,922 | B2 | 11/2012 | Lin et al. |
| 8,318,210 | B2 | 11/2012 | Nelson et al. |
| 8,361,176 | B2 | 1/2013 | Seth et al. |
| 8,440,292 | B2 | 5/2013 | Kanakarajan et al. |
| 8,487,019 | B2 | 7/2013 | Nelson et al. |
| 8,511,369 | B2 | 8/2013 | Boday et al. |
| 8,674,134 | B2 | 3/2014 | Zettl et al. |
| 8,697,100 | B2 | 4/2014 | Watanabe et al. |
| 8,703,023 | B2 | 4/2014 | Sainsbury et al. |
| 2009/0305043 | A1 | 12/2009 | Boussaas |
| 2010/0280138 | A1 | 11/2010 | Mofakhami |
| 2010/0291365 | A1 | 11/2010 | Lin et al. |
| 2010/0292508 | A1 | 11/2010 | Rajendran |
| 2011/0048923 | A1 | 3/2011 | Nelson et al. |
| 2012/0114905 | A1 | 5/2012 | Engler et al. |
| 2012/0273733 | A1 | 11/2012 | Sainsbury et al. |
| 2014/0017322 | A1 | 1/2014 | Dai et al. |

FOREIGN PATENT DOCUMENTS

| | | |
|---|---|---|
| JP | 2001192500 A | 7/2001 |
| JP | 2009221039 A | 10/2009 |
| TW | 506983 B | 10/2002 |
| WO | 2014130687 A1 | 8/2014 |

OTHER PUBLICATIONS

Ciofani Gianni et. al., "A simple approach to covalent functionalization of boron nitride nanotubes," Journal of Colloid and Interface Science, 374, dated 2012, pp. 308-314.

Yu Jinhong et. al., "Interfacial modification of boron nitride nanoplatelets for epoxy composites with improved thermal properties," Polymer, 53, dated 2012, pp. 471-480.

Ikuno T. et. al., "Amine-functionalized boron nitride nanotubes," Solid State Communications, 142, dated 2007, pp. 643-646.

Jin Wenqin et. al., "Surface functionalization of hexagonal boron nitride and its effect on the structure and performance of composites," Applied Surface Science, 270, dated 2013, pp. 561-571.

Ulus Hasan et. al., "Boron nitride-MW CNT/epoxy hybrid nanocomposites: Preparation and mechanical properties," Applied Surface Science, 318, dated 2014, pp. 37-42.

Xie Bin-Huan et. al., "Ultra-flexible polymethyl methacrylate composites induced by sliding of micron-sized hexagonal boron nitride platelets," Ceramics International, 39, dated 2013, pp. 8543-8548.

Kim Kiho et. al., "Fabrication of thermally conductive composite with surface modified boron nitride by epoxy wetting method," Ceramics International, 40, dated 2014, pp. 5181-5189.

Kim Kiho et. al., "Fabrication of UV-curable polyurethane acrylate composites containing surface-modified boron nitride for underwater sonar encapsulant application," Ceramics International, 40, dated 2014, pp. 10933-10943.

Muthu Naresh R. et. al., "Synthesis and characterization of polymer (sulfonated poly-ether-ether-ketone) based nanocomposite (h-boron nitride) membrane for hydrogen storage," International Journal of Hydrogen Energy, dated 2014, pp. 1-10.

Duan Zhi-Qiang et. al., "A simple and green route to transparent boron nitride/PVA nanocomposites with significantly improved mechanical and thermal properties," Chinese Chemical Letters, 24, dated 2013, pp. 17-19.

Sokołowska A. et. al., "Electric field used as the substitute for ultrasounds in the liquid exfoliation of hexagonal boron nitride," Microelectronic Engineering, dated 2014, pp. 1-13.

Bouville Florian et. al., "Dispersion of Boron Nitride Powders in Aqueous Suspensions with Cellulose," Journal of the American Ceramic Society, 97 [2], dated 2014, pp. 394-398.

Nazarov Albert S. et. al., "Functionalization and Dispersion of Hexagonal Boron Nitride (h-BN) Nanosheets Treated with Inorganic Reagents," Chemistry—An Asian Journal, 7, dated 2012, pp. 554-560.

Joni Made I. et. al., "Surface functionalization for dispersing and stabilizing hexagonal boron nitride nanoparticle by bead milling," Colloids and Surfaces A: Physicochemical and Engineering Aspects, 388, dated 2011, pp. 49-58.

MODIFIED NITRIDE PARTICLES, OLIGOMER FUNCTIONALIZED NITRIDE PARTICLES, POLYMER BASED COMPOSITES AND METHODS OF FORMING THEREOF

CROSS-REFERENCE TO RELATED APPLICATION

This Application claims priority under 35 U.S.C. § 119(e) to U.S. Provisional Application No. 62/273,078, entitled "Modified Nitride Particles, Oligomer Functionalized Nitride Particles, Polymer Based Composites and Methods of Forming Thereof," by Nazila Dadvand et al., filed on Dec. 30, 2015, which is assigned to the current assignee hereof and is incorporated herein by reference in its entirety.

FIELD OF THE DISCLOSURE

The following is directed to a method of surface modifying nitride particles and incorporation of the same in a polymer based composite. More particularly, the following is directed to a method of surface modifying boron nitride particles and incorporation of the same in a polymer based composite.

DESCRIPTION OF THE RELATED ART

Nitride particles may be utilized as a filler material added to polymer based composites as thermal fillers, to enhance mechanical properties of the composites, such as material wear resistance or peel strength, or as a solid lubricant. However, nitride particles are very difficult to disperse uniformly within an organic polymer matrix. Low dispersion of the nitride particles minimizes any beneficial effect that the filler material may have in the polymer based composite.

Accordingly, the industry continues to demand improved nitride particle filler material that is more dispersible within a polymer based composite while still maintaining its ability to improve thermal conductivity, peel strength and other mechanical properties of the polymer based composite.

SUMMARY

According to a first aspect, a surface modified nitride particle may include a nitride particle covalently bonded via a urethane moiety to an aromatic compound. The surface modified nitride particle may further include at least two auxiliary moieties.

According to another aspect, a method of forming a modified nitride particle may include activating a nitride particle to form at least one hydroxyl group and chemically reacting an aromatic compound with the at least one hydroxyl group on the nitride particle. The aromatic compound may include at least two auxiliary moieties.

According to yet another aspect, an oligomer functionalized nitride particle may include a nitride particle, an aromatic compound covalently bonded via a urethane moiety to the nitride particle and at least two oligomers covalently bonded to the aromatic compound via at least two auxiliary moieties of the aromatic compound.

According to still another aspect, a method of forming an oligomer functionalized nitride particle may include activating a nitride particle to form at least one hydroxyl group, chemically reacting an aromatic compound with the at least one hydroxyl group on the nitride particle. The aromatic compound may include at least two auxiliary moieties. The method may further include chemically reacting at least two oligomers covalently bonded to the aromatic compound via the at least two auxiliary moieties.

According to yet another aspect, a polymer based composite may include at least one polymer component and a modified nitride filler material dispersed within the polymer component. The modified nitride filler material may include a nitride particle, an aromatic compound covalently bonded via a urethane linkage to the nitride particle and at least two oligomer components covalently bonded to the aromatic compound.

According to still another aspect, a method of forming a polymer based composite may include combining at least one polymer component with a nitride filler material of oligomer functionalized nitride particles. The oligomer functionalized nitride particles may include a nitride particle, an aromatic compound covalently bonded via a urethane linkage to the nitride particle and at least two oligomer components covalently bonded to the aromatic compound.

BRIEF DESCRIPTION OF THE FIGURES

The present disclosure may be better understood, and its numerous features and advantages made apparent to those skilled in the art by referencing the accompanying drawings.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following is directed to methods of forming a modified nitride particle, a modified nitride particle, methods of forming an oligomer functionalized nitride particle, an oligomer functionalized nitride particle, methods of forming a polymer based composite including oligomer functionalized nitride particles, and a polymer based composite including oligomer functionalized nitride particles.

Figure 1:
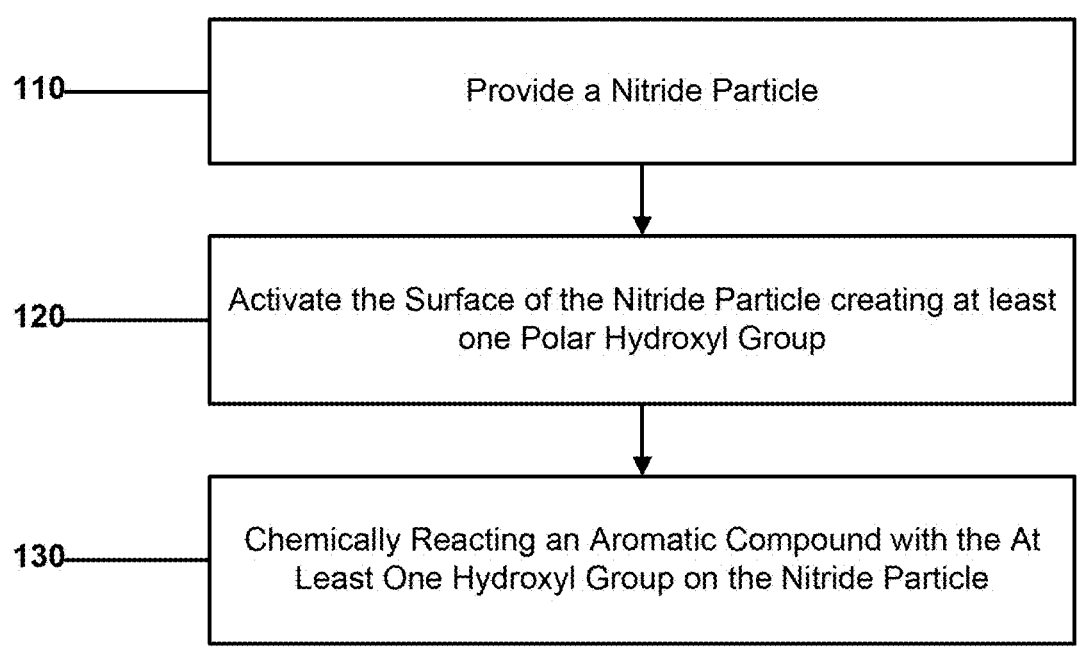
FIG. 1 includes an illustration of a flow diagram of a process for forming a modified nitride particle according to embodiments described herein.

Referring first to methods of forming a surface modified nitride particle, FIG. 1 illustrates a nitride particle surface modification process 100. Surface nitride particle modification process 100 may include a first step 110 of providing a nitride particle, a second step 120 of activating the surface of the nitride particle by creating at least one hydroxyl group, a third step 130 of chemically reacting an aromatic compound with the at least one hydroxyl group on the nitride particle.

According to certain embodiments, surface nitride particle modification process 100 may include modifying any nitride particle suitable for surface modification according to embodiments described herein. According to certain embodiments, the nitride particle may be a crystalline nitride particle or a partially crystalline nitride particle. According to still other embodiments, the nitride particle may be a boron nitride particle or a silicon nitride particle. According to still other embodiments, the boron nitride particle may be a cubic boron nitride particle. According to yet other embodiments, the boron nitride particle may be a hexagonal boron nitride particle.

Referring to second step 120, activating the surface of the nitride particle by creating at least one hydroxyl group may include applying an ultrasonic treatment to the nitride particle. According to still other embodiments, applying the ultrasonic treatment may include applying an ultrasonic treatment with hydrogen peroxide to the nitride particle. According to yet another embodiment, applying the ultrasonic treatment may include applying an ultrasonic treatment in a water based system. According to still other embodiments, applying the ultrasonic treatment may include applying an ultrasonic treatment in suspension. According to yet another embodiment, activating the surface of the nitride particle by creating at least one hydroxyl group may include applying a thermal treatment to the nitride particle.

According to still other embodiments, activating the surface of the nitride particle may include preferentially creating hydroxyl groups on the surface of the nitride particles. It will be appreciated that preferentially creating hydroxyl groups on the surface of the nitride particle may be understood to mean that a majority of the polar groups created on the surface of the nitride particle are hydroxyl groups. For example, preferentially creating hydroxyl groups on the surface of the nitride particle may include creating more hydroxyl groups than polar amine groups.

Referring to third step 130, chemically reacting an aromatic compound with the at least one hydroxyl group on the nitride particle may include creating a covalent bond between the aromatic compound and the nitride particle. According to still other embodiments, creating a covalent bond between the aromatic compound and the nitride particle may include creating a covalent bond via a urethane linkage to the nitride particle, as illustrated here:

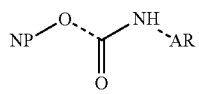

where NP represents the nitride particle and AR represents the aromatic compound.

According to still other embodiment, the aromatic compound may include a particular number of aromatic rings. For example, the aromatic compound may include at least one aromatic ring, such as, at least two aromatic rings or even at least three aromatic rings.

According to still other embodiments, the aromatic compound may include multiple isocyanate moieties. For example, the aromatic compound may include at least two isocyanate moieties, such as, at least three isocyanate moieties, at least four isocyanate moieties, five isocyanate moieties.

According to yet another embodiment, the aromatic compound may include di-isocyanate. According to still another embodiment, the aromatic compound may include tri-isocyanate. According to another embodiment, the aromatic compound may include 4-isocyanate. According to yet another embodiment, the aromatic compound may include 5-isocyanate. According to yet another embodiment, the aromatic compound may include 6-isocyanate.

According to yet other embodiments, the aromatic compound may include multiple auxiliary moieties. It will be appreciated that an auxiliary moiety may be defined as a moiety bonded to the aromatic compound but not to the nitride particle. According to particular embodiments, the aromatic compound may include at least two auxiliary moieties, such as, at east three auxiliary moieties, at least four auxiliary moieties or even at least five auxiliary moieties.

According to still other embodiments, the aromatic compound may include particular auxiliary moieties. For example, the aromatic compound may include a phenyl moiety, a biphenyl moiety, a naphthyl moiety, a phenanthryl moiety, a methylene-diphenyl moiety, a triphenyl-methane moiety or any combination thereof.

According to certain embodiments, nitride particle surface modification process 100 may be described according to the following reaction scheme:

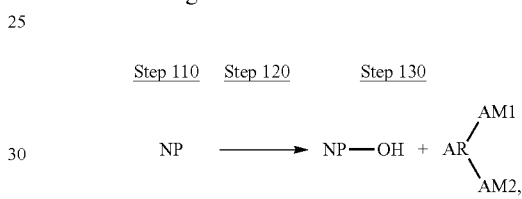

where NP represents the nitride particle, AR represents the aromatic compound, AM1 represents the first auxiliary moiety and AM2 represents the second auxiliary moiety.

According to particular embodiments, NP may be any nitride particle suitable for surface modification according to embodiments described herein. According to certain embodiments, the NP may be a crystalline nitride particle or a partially crystalline nitride particle. According to still other embodiments, the NP may be a boron nitride particle or a silicon nitride particle. According to still other embodiments, the NP may be a cubic boron nitride particle. According to yet other embodiments, the NP may be a hexagonal boron nitride particle.

According to other embodiments, the AR may include a particular number of aromatic rings. For example, AR may include at least one aromatic ring, such as, at least two aromatic rings or even at least three aromatic rings.

According to still other embodiments, the AR may include multiple isocyanate moieties. For example, the aromatic compound may include at least two isocyanate moieties, such as, at least three isocyanate moieties, at least four isocyanate moieties, five isocyanate moieties.

According to yet another embodiment, the AR may include di-isocyanate. According to still another embodiment, the AR may include tri-isocyanate. According to another embodiment, the AR may include 4-isocyanate. According to yet another embodiment, the AR may include 5-isocyanate. According to yet another embodiment, the AR may include 6-isocyanate.

According to yet another embodiment, the AR may include any aromatic compound as illustrated here:

AR:

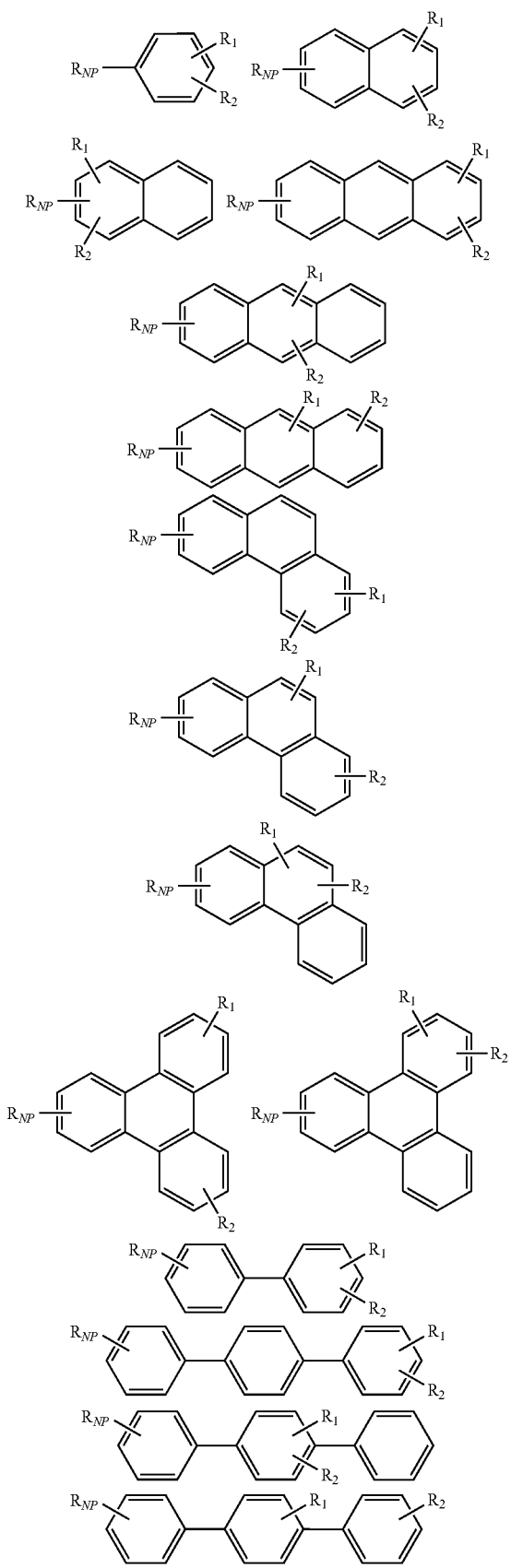

$R_{NP}$: linkage group binding to nitride particle
$R_1$, $R_2$: auxiliary moieties, auxiliary linkage to oligomers According to still other embodiments, the AM1 and AM2 may be the same auxiliary moieties. According to still other embodiments, the AM1 and AM2 may be different auxiliary moieties. According to yet other embodiments, AM1 and AM2 may be selected from OH, SH, $NH_2$, F, Cl, Br, I, COOH, CN, OCN, CNO, NCS or any combination thereof.

It will be appreciated that, though not shown in the formula above, the surface modified nitride particle may include more auxiliary moieties, such as, for example, AM3, AM4, AM5, AM6 and any such additional auxiliary moieties may further be selected from OH, SH, $NH_2$, F, Cl, Br, I, COOH, CN, OCN, CNO, NCS or any combination thereof.

Referring now to the surface modified nitride particle formed according to embodiments described herein, the surface modified nitride particle may include a nitride particle covalently bonded via a urethane linkage to an aromatic compound. The surface modified nitride particle may further include at least two auxiliary moieties.

According to certain embodiments, the nitride particle of the surface modified nitride particle may be any nitride particle suitable for surface modification according to embodiments described herein. According to certain embodiments, the nitride particle may be a crystalline nitride particle or a partially crystalline nitride particle. According to still other embodiments, the nitride particle may be a boron nitride particle or a silicon nitride particle. According to still other embodiments, the boron nitride particle may be a cubic boron nitride particle. According to yet other embodiments, the boron nitride particle may be a hexagonal boron nitride particle.

According to other embodiments, the aromatic compound of the surface modified nitride particle may include a particular number of aromatic rings. For example, the aromatic compound may include at least one aromatic ring, such as, at least two aromatic rings or even at least three aromatic rings.

According to still other embodiments, the aromatic compound of the surface modified nitride particle may include multiple isocyanate moieties. For example, the aromatic compound may include at least two isocyanate moieties, such as, at least three isocyanate moieties, at least four isocyanate moieties, five isocyanate moieties.

According to yet another embodiment, the aromatic compound of the surface modified nitride particle may include di-isocyanate. According to still another embodiment, the aromatic compound of the surface modified nitride particle may include tri-isocyanate. According to another embodiment, the aromatic compound of the surface modified nitride particle may include 4-isocyanate. According to yet another embodiment, the aromatic compound of the surface modified nitride particle may include 5-isocyanate. According to yet another embodiment, the aromatic compound of the surface modified nitride particle may include 6-isocyanate.

According to yet other embodiments, the aromatic compound of the surface modified nitride particle may include multiple auxiliary moieties. It will be appreciated that an auxiliary moiety may be defined as a moiety bonded to the aromatic compound but not to the nitride particle. According to particular embodiments, the aromatic compound may include at least two auxiliary moieties, such as, at east three auxiliary moieties, at least four auxiliary moieties or even at least five auxiliary moieties.

According to still other embodiments, the aromatic compound of the surface modified nitride particle may include particular auxiliary moieties. For example, the aromatic compound of the surface modified nitride particle may include a phenyl moiety, a biphenyl moiety, a naphthyl moiety, a phenanthryl moiety, a methylene-diphenyl moiety, a triphenyl-methane moiety or any combination thereof.

According to certain embodiments, the surface modified nitride particle formed according to embodiments described herein may be described as a compound having the following formula:

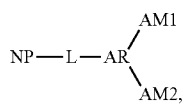

where NP represents the nitride particle, AR represents the aromatic compound, L represents the urethane linkage between the nitride particle and the aromatic compound, AM1 represents the first auxiliary moiety and AM2 represents the second auxiliary moiety.

According to particular embodiments, NP may be any nitride particle suitable for surface modification according to embodiments described herein. According to certain embodiments, the NP may be a crystalline nitride particle or a partially crystalline nitride particle. According to still other embodiments, the NP may be a boron nitride particle or a silicon nitride particle. According to still other embodiments, the NP may be a cubic boron nitride particle. According to yet other embodiments, the NP may be a hexagonal boron nitride particle.

According to other embodiments, the AR may include a particular number of aromatic rings. For example, AR may include at least one aromatic ring, such as, at least two aromatic rings or even at least three aromatic rings.

According to still other embodiments, the AR may include multiple isocyanate moieties. For example, the aromatic compound may include at least two isocyanate moieties, such as, at least three isocyanate moieties, at least four isocyanate moieties, five isocyanate moieties.

According to yet another embodiment, the AR may include di-isocyanate. According to still another embodiment, the AR may include tri-isocyanate. According to another embodiment, the AR may include 4-isocyanate. According to yet another embodiment, the AR may include 5-isocyanate. According to yet another embodiment, the AR may include 6-isocyanate.

According to yet another embodiment, the AR may include any aromatic compound as illustrated here:

AR:

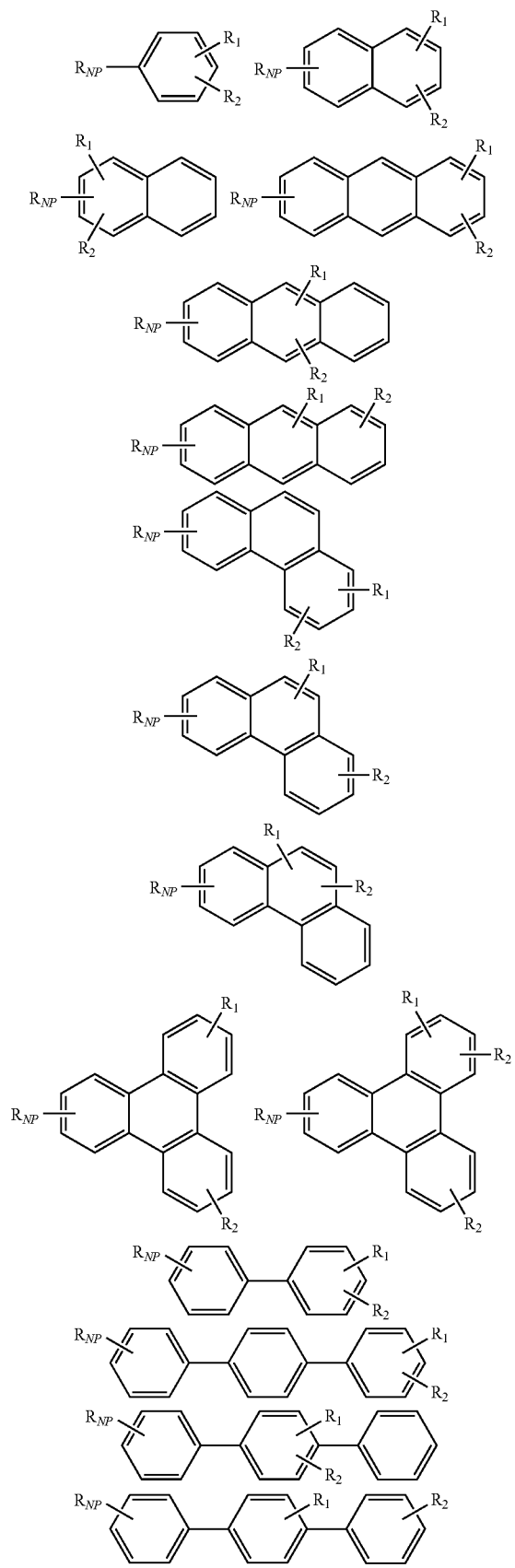

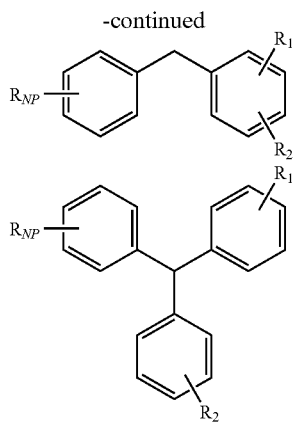

$R_{NP}$: linkage group binding to nitride particle
$R_1$, $R_2$: auxiliary moieties, auxiliary linkage to oligomers According to still other embodiments, the AM1 and AM2 may be the same auxiliary moieties. According to still other embodiments, the AM1 and AM2 may be different auxiliary moieties. According to yet other embodiments, AM1 and AM2 may be selected from OH, SH, $NH_2$, F, Cl, Br, I, COOH, CN, OCN, CNO, NCS or any combination thereof.

It will be appreciated that, though not shown in the formula above, the surface modified nitride particle may include more auxiliary moieties, such as AM3, AM4, AM5, AM6 and any such additional auxiliary moieties may further be selected from OH, SH, $NH_2$, F, Cl, Br, I, COOH, CN, OCN, CNO, NCS or any combination thereof.

Figure 2:
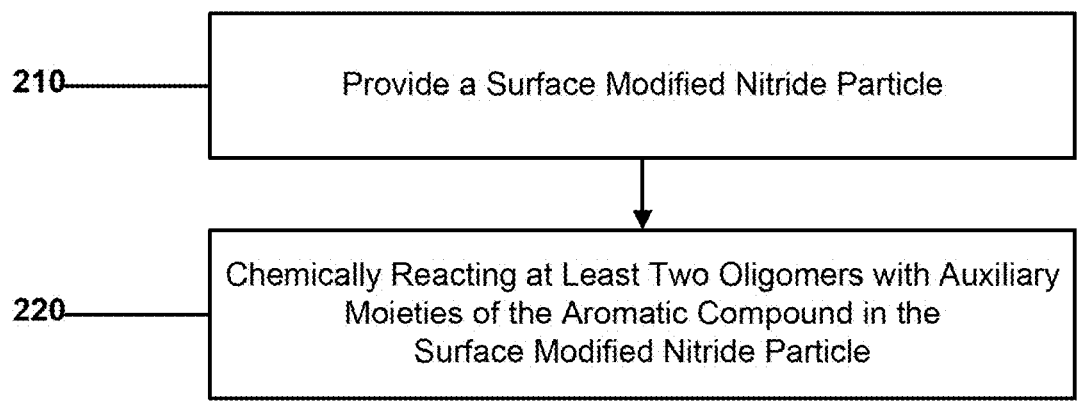
FIG. 2 includes an illustration of a flow diagram of a process for forming an oligomer functionalized nitride particle according to embodiments described herein.

Referring now to methods of forming an oligomer functionalized nitride particle, FIG. 2 illustrates a nitride particle oligomer functionalization process 200. Nitride particle oligomer functionalization process 200 may include a first step 210 of providing a surface modified nitride particle formed according to embodiments described herein and a second step 220 of chemically reacting at least two oligomers with the auxiliary moieties of the aromatic compound in the surface modified nitride particle. It will be appreciated that the modified nitride particle may be formed according to any embodiment described herein and may further include any components described herein.

Referring to second step 220, according to certain embodiments, the two oligomers that are chemically reacted with the auxiliary moieties of the aromatic compound may include particular monomer units. For example, the two oligomers may include monomer units of silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the two oligomers may include monomer units of a fluoropolymer. For example, the two oligomers may include monomer units of PTFE, ETFE or PFA.

According to still other embodiments, the two oligomers that are chemically reacted with the auxiliary moieties of the aromatic compound may be particular oligomers. For example, the two oligomers may be silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the two oligomers may be fluoropolymers. For example, the two oligomers may be PTFE, ETFE or PFA.

According to certain embodiments, nitride particle oligomer functionalization process 200 may be described according to the following reaction scheme:

Step 210            Step 220

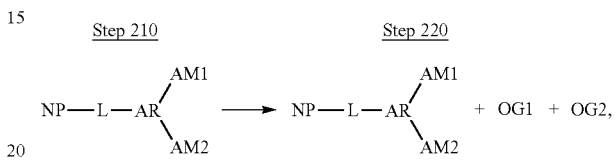

where NP represents the nitride particle, AR represents the aromatic compound, L represents the urethane linkage between the nitride particle and the aromatic compound, OG1 represents a first oligomer, AL1 represents the first auxiliary linkage between the AR and OG1, OG2 represents a second oligomer and AL2 represents a second auxiliary linkage between AR and OG2.

According to particular embodiments, NP may be any nitride particle suitable for surface modification according to embodiments described herein. According to certain embodiments, the NP may be a crystalline nitride particle or a partially crystalline nitride particle. According to still other embodiments, the NP may be a boron nitride particle or a silicon nitride particle. According to still other embodiments, the NP may be a cubic boron nitride particle. According to yet other embodiments, the NP may be a hexagonal boron nitride particle.

According to other embodiments, the AR may include a particular number of aromatic rings. For example, AR may include at least one aromatic ring, such as, at least two aromatic rings or even at least three aromatic rings.

According to still other embodiments, the AR may include multiple isocyanate moieties. For example, the aromatic compound may include at least two isocyanate moieties, such as, at least three isocyanate moieties, at least four isocyanate moieties, five isocyanate moieties.

According to yet another embodiment, the AR may include di-isocyanate. According to still another embodiment, the AR may include tri-isocyanate. According to another embodiment, the AR may include 4-isocyanate. According to yet another embodiment, the AR may include 5-isocyanate. According to yet another embodiment, the AR may include 6-isocyanate.

According to yet another embodiment, the AR may include any aromatic compound as illustrated here:

AR:

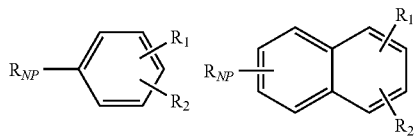

-continued

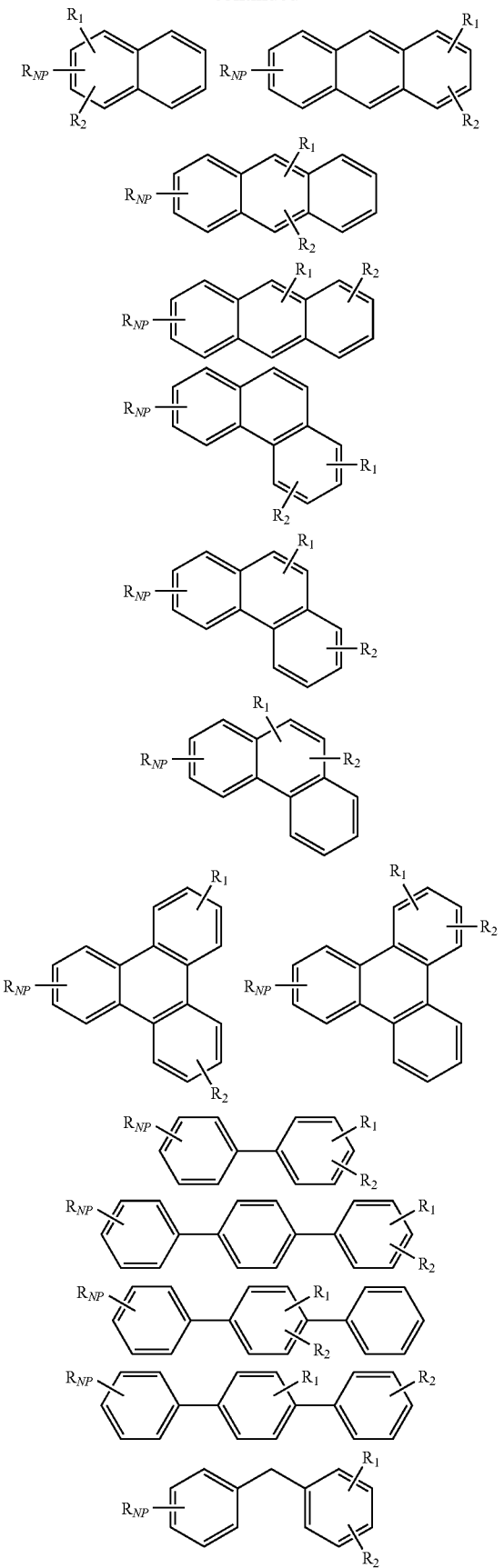

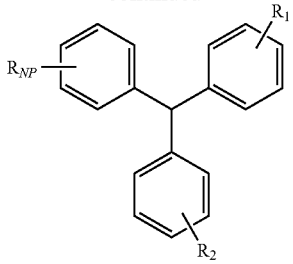

$R_{NP}$: linkage group binding to nitride particle
$R_1$, $R_2$: auxiliary moieties, auxiliary linkage to oligomers According to still other embodiments, the AM1 and AM2 may be the same auxiliary moieties. According to still other embodiments, the AM1 and AM2 may be different auxiliary moieties. According to yet other embodiments, AM1 and AM2 may be selected from OH, SH, $NH_2$, F, Cl, Br, I, COOH, CN, OCN, CNO, NCS or any combination thereof.

According to still other embodiments, OG1 and OG2 may include particular monomer units. For example, the OG1 and OG2 may include monomer units of silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, OG1 and OG2 may include monomer units of a fluoropolymer. For example, OG1 and OG2 may include monomer units of PTFE, ETFE or PFA.

According to still other embodiments, OG1 and OG2 may be particular oligomers. For example, OG1 and OG2 may be silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, OG1 and OG2 may be fluoropolymers. For example, OG1 and OG2 may be PTFE, ETFE or PFA.

Referring now to the oligomer functionalized nitride particle formed according to embodiments described herein, the oligomer functionalized nitride particle may include a nitride particle, an aromatic compound covalently bonded via a urethane moiety to the nitride particle, and at least two oligomers covalently bonded to the aromatic compound through at least two auxiliary moieties of the aromatic compound.

According to certain embodiments, the nitride particle of the oligomer functionalized nitride particle may be any nitride particle suitable for nitride particle oligomer functionalization according to embodiments described herein. According to certain embodiments, the nitride particle may be a crystalline nitride particle or a partially crystalline nitride particle. According to still other embodiments, the nitride particle may be a boron nitride particle or a silicon nitride particle. According to still other embodiments, the boron nitride particle may be a cubic boron nitride particle.

According to yet other embodiments, the boron nitride particle may be a hexagonal boron nitride particle.

According to other embodiments, the aromatic compound of the oligomer functionalized nitride particle may include a particular number of aromatic rings. For example, the aromatic compound may include at least one aromatic ring, such as, at least two aromatic rings or even at least three aromatic rings.

According to still other embodiments, the aromatic compound of the oligomer functionalized nitride particle may include multiple isocyanate moieties. For example, the aromatic compound may include at least two isocyanate moieties, such as, at least three isocyanate moieties, at least four isocyanate moieties, five isocyanate moieties.

According to yet another embodiment, the aromatic compound of the oligomer functionalized nitride particle may include di-isocyanate. According to still another embodiment, the aromatic compound of the oligomer functionalized nitride particle may include tri-isocyanate. According to another embodiment, the aromatic compound of the oligomer functionalized nitride particle may include 4-isocyanate. According to yet another embodiment, the aromatic compound of the oligomer functionalized nitride particle may include 5-isocyanate. According to yet another embodiment, the aromatic compound of the oligomer functionalized nitride particle may include 6-isocyanate.

According to yet other embodiments, the aromatic compound of the oligomer functionalized nitride particle may include multiple auxiliary moieties. It will be appreciated that an auxiliary moiety may be defined as a moiety bonded to the aromatic compound but not to the nitride particle. According to particular embodiments, the aromatic compound may include at least two auxiliary moieties, such as, at east three auxiliary moieties, at least four auxiliary moieties or even at least five auxiliary moieties.

According to still other embodiments, the aromatic compound of the oligomer functionalized nitride particle may include particular auxiliary moieties. For example, the aromatic compound of the oligomer functionalized nitride particle may include a phenyl moiety, a biphenyl moiety, a naphthyl moiety, a phenanthryl moiety, a methylene-diphenyl moiety, a triphenyl-methane moiety or any combination thereof.

According to still other embodiments, the at least two oligomers of the oligomer functionalized nitride particle may include particular monomer units. For example, the at least two oligomers may include monomer units of silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the at least two oligomers may include monomer units of a fluoropolymer. For example, the at least two oligomers may include monomer units of PTFE, ETFE or PFA.

According to still other embodiments, the at least two oligomers of the oligomer functionalized nitride particle may be particular oligomers. For example, the at least two oligomers may be silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the at least two oligomers may be fluoropolymers. For example, the at least two oligomers may be PTFE, ETFE or PFA.

According to certain embodiments, the oligomer functionalized nitride particle formed according to embodiments described herein may be described as a compound having the following formula:

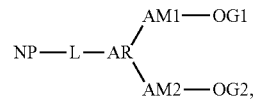

where NP represents the nitride particle, AR represents the aromatic compound, L represents the urethane linkage between the nitride particle and the aromatic compound, OG1 represents a first oligomer, AL1 represents the first auxiliary linkage between the AR and OG1, OG2 represents a second oligomer and AL2 represents a second auxiliary linkage between AR and OG2.

According to particular embodiments, NP may be any nitride particle suitable for surface modification according to embodiments described herein. According to certain embodiments, the NP may be a crystalline nitride particle or a partially crystalline nitride particle. According to still other embodiments, the NP may be a boron nitride particle or a silicon nitride particle. According to still other embodiments, the NP may be a cubic boron nitride particle. According to yet other embodiments, the NP may be a hexagonal boron nitride particle.

According to other embodiments, the AR may include a particular number of aromatic rings. For example, AR may include at least one aromatic ring, such as, at least two aromatic rings or even at least three aromatic rings.

According to still other embodiments, the AR may include multiple isocyanate moieties. For example, the aromatic compound may include at least two isocyanate moieties, such as, at least three isocyanate moieties, at least four isocyanate moieties, five isocyanate moieties.

According to yet another embodiment, the AR may include di-isocyanate. According to still another embodiment, the AR may include tri-isocyanate. According to another embodiment, the AR may include 4-isocyanate. According to yet another embodiment, the AR may include 5-isocyanate. According to yet another embodiment, the AR may include 6-isocyanate.

According to yet another embodiment, the AR may include any aromatic compound as illustrated here:

AR:

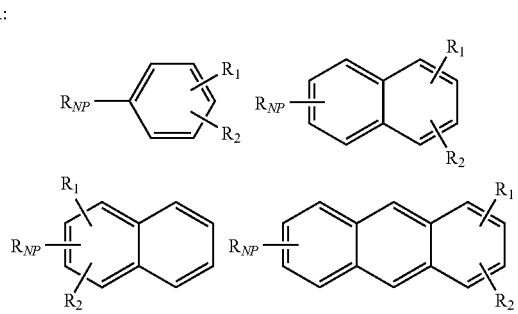

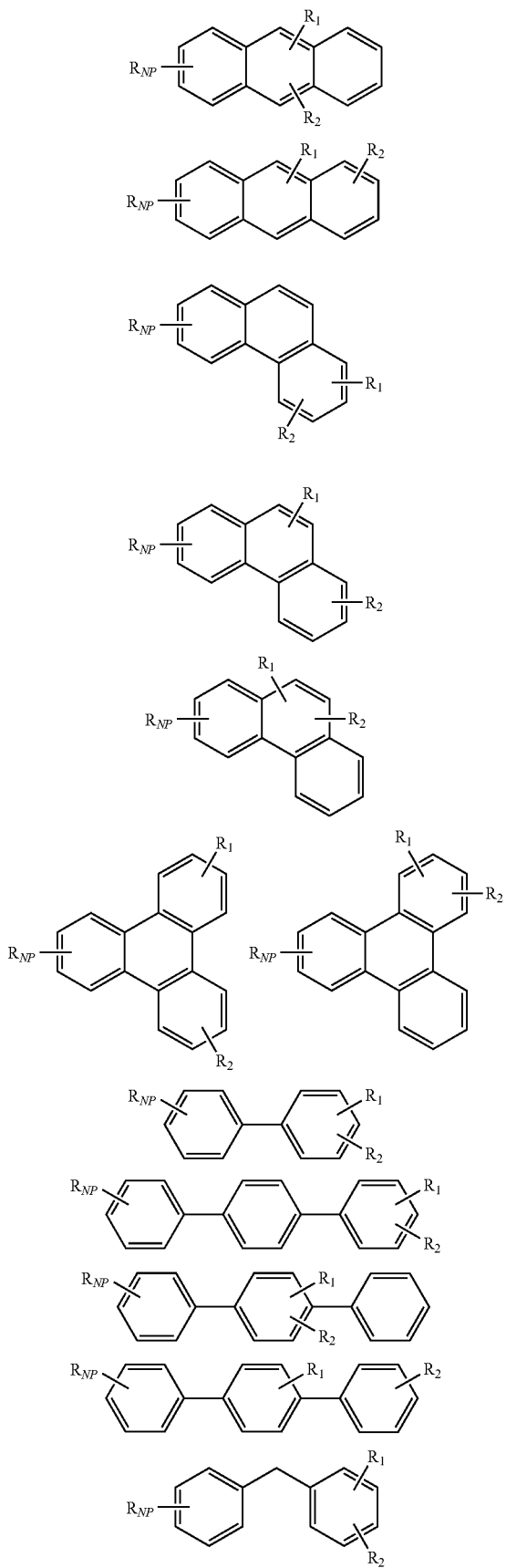

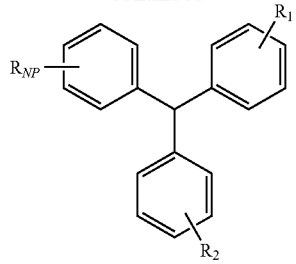

$R_{NP}$: linkage group binding to nitride particle
$R_1$, $R_2$: auxiliary moieties, auxiliary linkage to oligomers According to still other embodiments, the AL1 and AL2 may be the same auxiliary moieties. According to still other embodiments, the AL1 and AL2 may be different auxiliary moieties. According to yet other embodiments, AL1 and AL2 may be selected from OH, SH, $NH_2$, F, Cl, Br, I, COOH, CN, OCN, CNO, NCS or any combination thereof.

According to still other embodiments, OG1 and OG2 may include particular monomer units. For example, the OG1 and OG2 may include monomer units of silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, OG1 and OG2 may include monomer units of a fluoropolymer. For example, OG1 and OG2 may include monomer units of PTFE, ETFE or PFA.

According to still other embodiments, OG1 and OG2 may be particular oligomers. For example, OG1 and OG2 may be silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, OG1 and OG2 may be fluoropolymers. For example, OG1 and OG2 may be PTFE, ETFE or PFA.

Figure 3:
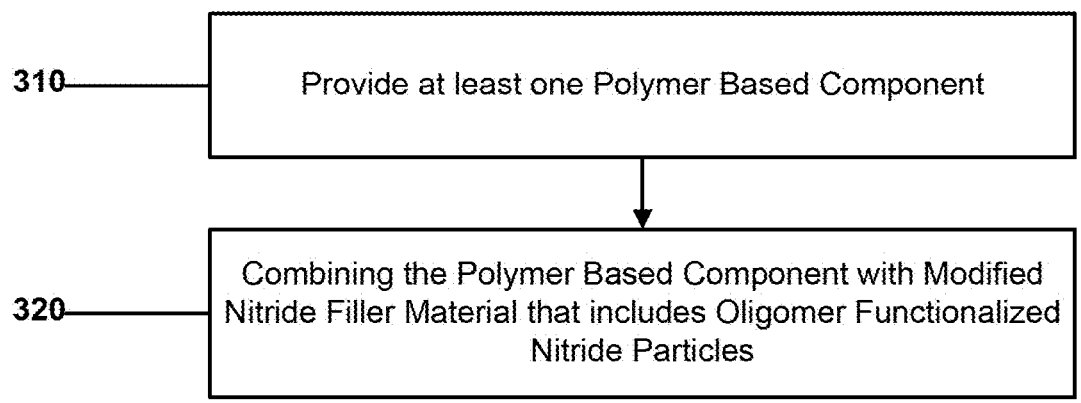
FIG. 3 includes an illustration of a flow diagram of a process for forming polymer based composite that includes oligomer functionalized nitride particles according to embodiments described herein.

Referring now to methods of forming a polymer based composite including oligomer functionalized nitride particles, FIG. 3 illustrates a polymer based composite forming process 300. Polymer based composite forming process 300 may include a first step 310 of providing at least one polymer component and a second step 320 of combining the polymer component with a modified nitride filler material that includes oligomer functionalized nitride particles. It will be appreciated that the oligomer functionalized nitride particles may be formed according to any embodiment described herein and may further include any components described herein.

Referring to first step 310, according to certain embodiments, the polymer component may include particular monomer units. For example, the polymer component may include monomer units of silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the polymer component may include monomer units of a fluoropolymer. For example, the polymer component may include monomer units of PTFE, ETFE or PFA.

According to still other embodiments, the polymer component may be particular oligomers. For example, the polymer component may be silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the polymer component may be fluoropolymers. For example, the polymer component may be PTFE, ETFE or PFA.

According to yet other embodiments, a monomer unit of the polymer component may be from the same organic component family as a monomer unit of the oligomer components. According to still other embodiments, a monomer unit of the polymer component may be the same as a monomer unit of the oligomer components.

Referring now to the polymer based composite formed according to embodiments described herein, the polymer based composite may include at least one polymer component and a modified nitride filler material dispersed within the polymer component. The modified nitride filler material may include oligomer functionalized nitride particles. The oligomer functionalized nitride particles may include a nitride particle, an aromatic compound covalently bonded via a urethane moiety to the nitride particle, and at least two oligomers covalently bonded to the aromatic compound through at least two auxiliary moieties of the aromatic compound.

According to certain embodiments, the nitride particle of the oligomer functionalized nitride particle in the polymer based composite may be any nitride particle suitable for nitride particle oligomer functionalization according to embodiments described herein. According to certain embodiments, the nitride particle may be a crystalline nitride particle or a partially crystalline nitride particle. According to still other embodiments, the nitride particle may be a boron nitride particle or a silicon nitride particle. According to still other embodiments, the boron nitride particle may be a cubic boron nitride particle. According to yet other embodiments, the boron nitride particle may be a hexagonal boron nitride particle.

According to other embodiments, the aromatic compound of the oligomer functionalized nitride particle in the polymer based composite may include a particular number of aromatic rings. For example, the aromatic compound may include at least one aromatic ring, such as, at least two aromatic rings or even at least three aromatic rings.

According to still other embodiments, the aromatic compound of the oligomer functionalized nitride particle in the polymer based composite may include multiple isocyanate moieties. For example, the aromatic compound may include at least two isocyanate moieties, such as, at least three isocyanate moieties, at least four isocyanate moieties, five isocyanate moieties.

According to yet another embodiment, the aromatic compound of the oligomer functionalized nitride particle in the polymer based composite may include di-isocyanate. According to still another embodiment, the aromatic compound of the oligomer functionalized nitride particle may include tri-isocyanate. According to another embodiment, the aromatic compound of the oligomer functionalized nitride particle may include 4-isocyanate. According to yet another embodiment, the aromatic compound of the oligomer functionalized nitride particle may include 5-isocyanate. According to yet another embodiment, the aromatic compound of the oligomer functionalized nitride particle may include 6-isocyanate.

According to yet other embodiments, the aromatic compound of the oligomer functionalized nitride particle in the polymer based composite may include multiple auxiliary moieties. It will be appreciated that an auxiliary moiety may be defined as a moiety bonded to the aromatic compound but not to the nitride particle. According to particular embodiments, the aromatic compound may include at least two auxiliary moieties, such as, at east three auxiliary moieties, at least four auxiliary moieties or even at least five auxiliary moieties.

According to still other embodiments, the aromatic compound of the oligomer functionalized nitride particle in the polymer based composite may include particular auxiliary moieties. For example, the aromatic compound of the oligomer functionalized nitride particle may include a phenyl moiety, a biphenyl moiety, a naphthyl moiety, a phenanthryl moiety, a methylene-diphenyl moiety, a triphenyl-methane moiety or any combination thereof.

According to still other embodiments, the at least two oligomers of the oligomer functionalized nitride particle in the polymer based composite may include particular monomer units. For example, the at least two oligomers may include monomer units of silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the at least two oligomers may include monomer units of a fluoropolymer. For example, the at least two oligomers may include monomer units of PTFE, ETFE or PFA.

According to still other embodiments, the at least two oligomers of the oligomer functionalized nitride particle in the polymer based composite may be particular oligomers. For example, the at least two oligomers may be silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the at least two oligomers may be fluoropolymers. For example, the at least two oligomers may be PTFE, ETFE or PFA.

According to yet other embodiments, the polymer component in the polymer based composite may include particular monomer units. For example, the polymer component may include monomer units of silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the polymer component may include monomer units of a fluoropolymer. For example, the polymer component may include monomer units of PTFE, ETFE or PFA.

According to still other embodiments, the polymer component in the polymer based composite may be particular oligomers. For example, the polymer component may be silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC) or poly(dimethylsiloxane). According to still other embodiments, the polymer component may be fluoropolymers. For example, the polymer component may be PTFE, ETFE or PFA.

According to yet other embodiments, a monomer unit of the polymer component in the polymer based composite may be from the same organic component family as a monomer unit of the oligomer components in the polymer based composite. According to still other embodiments, a monomer unit of the polymer component in the polymer based composite may be the same as a monomer unit of the oligomer components in the polymer based composite.

According to still other embodiments, a polymer based composite formed according to embodiments described herein may have a particular peel strength as measured according to IPC standard 2.4.9. For example, a polymer based composite formed according to embodiments described herein may have a peel strength of at least about 5 N/in, such as, at least about 18 N/in or even at least about 20 N/in. According to still other embodiments, a polymer based composite formed according to embodiments described herein may have a peel strength of not greater than about 100 N/in, such as, not greater than about 75 N/in or even not greater than about 50 N/in. It will be appreciated that the peel strength of a polymer based composite formed according to embodiments described herein may be any value between any of minimum and maximum values noted above. It will be further appreciated that the peel strength of a polymer based composite formed according to embodiments described may be within a range between any of the minimum and maximum values noted above.

According to yet other embodiments, a polymer based composite formed according to embodiments described herein may have a particular original peel strength percentage equal to CPL/PPL*100, where CPL is equal to the peel strength of the polymer based composite and PPL is equal to the peel strength of the polymer component alone that is used to form the polymer based composite. It will be appreciated that peel strength is measured according to IPC standard 2.4.9. According to particular embodiments, a polymer based composite formed according to embodiments described herein may have an original peel strength percentage of at least about 60%, such as, at least about 70%, at least about 75%, at least about 80%, at least about 90%, at least about 95%, at least about 100%, at least about 105%, at least about 110%, at least about 120%, at least about 125%, at least about 130%, at least about 135%, at least about 140%, at least about 150%, at least about 175% or even at least about 200%. According to still other embodiments, a polymer based composite formed according to embodiments described herein may have an original peel strength percentage of not greater than about 250%. It will be appreciated that the original peel strength percentage of a polymer based composite formed according to embodiments described herein may be any value between any of minimum and maximum values noted above. It will be further appreciated that the original peel strength percentage of a polymer based composite formed according to embodiments described may be within a range between any of the minimum and maximum values noted above. According to still other embodiments, a polymer based composite formed according to embodiments described herein may have a particular thermal conductivity. Thermal conductivity is calculated as the product of thermal diffusivity, density and heat capacity. More particularly, through plane thermal conductivity is calculated as the product of the through plane thermal diffusivity, the density and the heat capacity. The thermal diffusivity of the composite polymer is measured according to the standard ASTM C-518 by the thermal flows method. The diffusivity is measured perpendicularly to the composite polymer layer. The heat capacity of the composite polymer is measured by DSC (differential scanning calorimetry) on a Netzsch thermobalance. The composite polymer density is measured by Helium pycnometry.

According to certain embodiments, a polymer based composite formed according to embodiments described herein may have a thermal conductivity of at least about 0.2 W/mK, such as, at least about 0.5 W/mK, at least about 1 W/mK, at least about 2 W/mK, at least about 3 W/mK, at least about 5 W/mK, at least about 7 W/mK, or even at least about 10 W/mK. According to still other embodiments, a polymer based composite formed according to embodiments described herein may have a thermal conductivity of not greater than about 20 W/mK, such as, not greater than about 15 W/mK. It will be appreciated that the thermal conductivity of a polymer based composite formed according to embodiments described herein may be any value between any of minimum and maximum values noted above. It will be further appreciated that the thermal conductivity of a polymer based composite formed according to embodiments described may be within a range between any of the minimum and maximum values noted above.

According to yet other embodiments, a polymer based composite formed according to embodiments described herein may have a particular original thermal conductivity percentage equal to CTC/PTC*100, where CTC is equal to the thermal conductivity of the polymer based composite and PTC is equal to the thermal conductivity of the polymer component alone that is used to form the polymer based composite. It will be appreciated that thermal conductivity of both the composite are measured according to the standard outlined above. According to particular embodiments, a polymer based composite formed according to embodiments described herein may have an original thermal conductivity percentage of at least about 200%, such as, at least about 300%, at least about 400%, at least about 500%, at least about 1000%, at least about 2000%, at least about 5000%, or even at least about 10000%. According to still other embodiments, a polymer based composite formed according to embodiments described herein may have an original thermal conductivity percentage of not greater than about 20000%. It will be appreciated that the original thermal conductivity percentage of a polymer based composite formed according to embodiments described herein may be any value between any of minimum and maximum values noted above. It will be further appreciated that the original thermal conductivity percentage of a polymer based composite formed according to embodiments described may be within a range between any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A surface modified nitride particle comprising: a nitride particle covalently bonded via a urethane moiety to an aromatic compound; and at least two auxiliary moieties.

Embodiment 2

A method of forming a modified nitride particle, wherein the method comprises: activating a nitride particle to form at least one hydroxyl group; chemically reacting an aromatic compound with the at least one hydroxyl group on the nitride particle, wherein the aromatic compound comprises at least two auxiliary moieties.

Embodiment 3

The surface modified nitride particle or method of any one of embodiments 1 and 2, wherein the nitride particle is a boron nitride particle or a silicon nitride particle.

Embodiment 4

The surface modified nitride particle or method of any one of embodiments 1 and 2, wherein the nitride particle is a hexagonal boron nitride particle.

Embodiment 5

The surface modified nitride particle or method of any one of embodiments 1 and 2, wherein a majority of any moieties connecting the nitride particle and the aromatic compound are urethane moieties.

Embodiment 6

The surface modified nitride particle or method of any one of embodiments 1 and 2, wherein the aromatic compound comprises at least one aromatic ring, at least two aromatic rings, at least three aromatic rings.

Embodiment 7

The surface modified nitride particle or method of any one of embodiments 1 and 2, wherein the aromatic compound comprises a phenyl moiety, a biphenyl moiety, a naphthyl moiety, a phenanthryl moiety, a methylene-diphenyl moiety, a triphenyl-methane moiety.

Embodiment 8

The surface modified nitride particle or method of any one of embodiments 1 and 2, wherein the at least two auxiliary moieties are amino groups (—NH2), hydroxyl groups (—OH), fluoro groups (—F), chloro groups (—Cl), bromo groups (—Br), iodo groups (—I), carboxyl groups (—COOH), cyano groups (—CN), cyanate groups (—OCN), isocyanate groups (—NCO), thiol groups (—SH), or thioisocyanate groups (—NCS).

Embodiment 9

The surface modified nitride particle or method of any one of embodiments 1 and 2, wherein the aromatic compound comprises two isocyanate moieties, three isocyanate moieties, four isocyanate moieties, five isocyanate moieties.

Embodiment 10

An oligomer functionalized nitride particle comprising: a nitride particle; an aromatic compound covalently bonded via a urethane moiety to the nitride particle; and at least two oligomers covalently bonded to the aromatic compound via at least two auxiliary moieties of the aromatic compound.

Embodiment 11

A method of forming an oligomer functionalized nitride particle, wherein the method comprises: activating a nitride particle to form at least one hydroxyl group; chemically reacting an aromatic compound with the at least one hydroxyl group on the nitride particle, wherein the aromatic compound comprises at least two auxiliary moieties; and chemically reacting at least two oligomers covalently bonded to the aromatic compound via the at least two auxiliary moieties.

Embodiment 12

The oligomer functionalized nitride particle or method of any one of embodiments 10 and 11, wherein the nitride particle is a boron nitride particle or a silicon nitride particle.

Embodiment 13

The oligomer functionalized nitride particle or method of any one of embodiments 10 and 11, wherein the nitride particle is a hexagonal boron nitride particle.

Embodiment 14

The oligomer functionalized nitride particle or method of any one of embodiments 10 and 11, wherein a majority of any moieties connecting the nitride particle and the aromatic compound are urethane moieties.

Embodiment 15

The oligomer functionalized nitride particle or method of any one of embodiments 10 and 11, wherein the aromatic compound comprises at least one aromatic ring, at least two aromatic rings, at least three aromatic rings.

Embodiment 16

The oligomer functionalized nitride particle or method of any one of embodiments 10 and 11, wherein the aromatic compound comprises a phenyl moiety, a biphenyl moiety, a naphthyl moiety, a phenanthryl moiety, a methylene-diphenyl moiety, a triphenyl-methane moiety.

Embodiment 17

The oligomer functionalized nitride particle or method of any one of embodiments 10 and 11, wherein the at least two auxiliary moieties are amino groups (—NH2), hydroxyl groups (—OH), fluoro groups (—F), chloro groups (—Cl), bromo groups (—Br), iodo groups (—I), carboxyl groups (—COOH), cyano groups (—CN), cyanate groups (—OCN), isocyanate groups (—NCO), thiol groups (—SH), or thioisocyanate groups (—NCS).

Embodiment 18

The oligomer functionalized nitride particle or method of any one of embodiments 10 and 11, wherein the aromatic compound comprises two isocyanate moieties, three isocyanate moieties, four isocyanate moieties, five isocyanate moieties.

Embodiment 19

The oligomer functionalized nitride particle or method of any one of embodiments 10 and 11, wherein the oligomer components comprises silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole (PBO and PBI), polycarbonate (PC), polyether sulfone (PES), poly ether ether ketone (PEEK), polyetherimide (PEI), polyethylene (PE), polyphenylene oxide (PPO), polyphenylene sulfide (PPS), polyether sulfone (PES), polysulfone (PS), polypropylene (PP), polystyrene (PS), polyvinyl chloride (PVC), poly(dimethylsiloxane) or a fluoropolymer.

Embodiment 20

The oligomer functionalized nitride particle or method of embodiment 19, wherein the fluoro-based oligomers comprises of PTFE, ETFE, FEP, ECTFE or PFA.

Embodiment 21

A polymer based composite comprising: at least one polymer component and a modified nitride filler material dispersed within the polymer component, wherein the modified nitride filler material comprises: a nitride particle; an aromatic compound covalently bonded via a urethane linkage to the nitride particle; and at least two oligomer components covalently bonded to the aromatic compound.

Embodiment 22

A method of forming a polymer based composite, wherein the method comprises: combining at least one polymer component with a nitride filler material of oligomer functionalized nitride particles, wherein each of the oligomer functionalized nitride particles comprise: a nitride particle; an aromatic compound covalently bonded via a urethane linkage to the nitride particle; and at least two oligomer components covalently bonded to the aromatic compound.

Embodiment 23

The polymer composite or method of any one of embodiments 21 and 22, wherein the nitride particle is a boron nitride particle or a silicon nitride particle.

Embodiment 24

The polymer composite or method of any one of embodiments 21 and 22, wherein the nitride particle is a hexagonal boron nitride particle.

Embodiment 25

The oligomer functionalized nitride particle or method of any one of embodiments 21 and 22, wherein a majority of any moieties connecting the nitride particle and the aromatic compound are urethane moieties.

Embodiment 26

The polymer composite or method of any one of embodiments 21 and 22, wherein the aromatic compound comprises at least one aromatic ring, at least two aromatic rings, at least three aromatic rings.

Embodiment 27

The polymer composite or method of any one of embodiments 21 and 22, wherein the aromatic compound comprises a phenyl moiety, a biphenyl moiety, a naphthyl moiety, a phenanthryl moiety, a methylene-diphenyl moiety, a triphenyl-methane moiety.

Embodiment 28

The oligomer functionalized nitride particle or method of any one of embodiments 21 and 22, wherein the at least two auxiliary moieties are amino groups (—NH2), hydroxyl groups (—OH), fluoro groups (—F), chloro groups (—Cl), bromo groups (—Br), iodo groups (—I), carboxyl groups (—COOH), cyano groups (—CN), cyanate groups (—OCN), isocyanate groups (—NCO), thiol groups (—SH), or thioisocyanate groups (—NCS).

Embodiment 29

The polymer composite or method of any one of embodiments 21 and 22, wherein the aromatic compound comprises two isocyanate moieties, three isocyanate moieties, four isocyanate moieties, five isocyanate moieties.

Embodiment 30

The polymer composite or method of any one of embodiments 21 and 22, wherein the polymer component comprises silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole (PBO and PBI), polycarbonate (PC), polyether sulfone (PES), poly ether ether ketone (PEEK), polyetherimide (PEI), polyethylene (PE), polyphenylene oxide (PPO), polyphenylene sulfide (PPS), polysulfone, polypropylene (PP), polystyrene (PS), polyvinyl chloride (PVC), poly(dimethylsiloxane) or a fluoropolymer.

Embodiment 31

The polymer composite or method of embodiment 30, wherein the fluoro-based polymer comprises PTFE, ETFE, FEP, ECTFE or PFA.

Embodiment 32

The polymer based composite or method of any one of embodiments 21 and 22, wherein a monomer unit of the polymer component is from the same family as a monomer unit of the oligomer components.

Embodiment 33

The polymer based composite or method of embodiment 32, wherein a monomer unit of the polymer component is the same as a monomer unit of the oligomer components.

Embodiment 34

The polymer composite or method of any one of embodiments 21 and 22, wherein the polymer component comprises a thermoset polymer or a thermoplastic polymer.

Embodiment 35

The polymer based composite or method of embodiment 34, wherein the polymer component comprises silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole (PBO and PBI), polycarbonate (PC), polyether sulfone (PES), poly ether ether ketone (PEEK), polyetherimide (PEI), polyethylene (PE), polyphenylene oxide (PPO), polyphenylene sulfide (PPS), polysulfone, polypropylene (PP), polystyrene (PS), polyvinyl chloride (PVC), poly(dimethylsiloxane) or a fluoropolymer.

Embodiment 36

The polymer composite or method of any one of embodiments 21 and 22, wherein the polymer component comprises phenol formaldehyde resins, Bakelite, Novotext (cotton fibre-reinforced phenolic), Oasis (an open-celled phenolic foam), Maritex Aquarius, poly-butadiene, styrene-butadiene copolymer, Kapton(poly-oxydiphenylene-pyromellitimide), aliphatic polyimides, aromatic polyimides, semiaromatic polyimides, Acrylated saturated/unsaturated aliphatic polyurethane, Polybutadiene rubber blended with nitrile rubber, styrene-butadiene copolymer or UTEM.

Embodiment 37

The polymer composite or method of any one of embodiments 21 and 22, wherein the fluoro-based polymer comprises PTFE, ETFE, FEP, ECTFE or PFA.

Embodiment 38

The polymer composite or method of any one of embodiments 21 and 22, wherein the oligomer components comprises silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole (PBO and PBI), polycarbonate (PC), polyether sulfone (PES), poly ether ether ketone (PEEK), polyetherimide (PEI), polyethylene (PE), polyphenylene oxide (PPO), polyphenylene sulfide (PPS), polysulfone, polypropylene (PP), polystyrene (PS), polyvinyl chloride (PVC), poly(dimethylsiloxane) or a fluoropolymer.

Embodiment 39

The polymer based composite of embodiment 38, wherein the fluoro-based oligomers comprises of PTFE, ETFE or PFA.

Embodiment 40

The polymer composite or method of any one of embodiments 21 and 22, wherein the polymer based composite comprises a peel strength of at least about 10 N/in and a thermal conductivity of at least about 0.2 W/mK.

Embodiment 41

The polymer composite or method of any one of embodiments 21 and 22, wherein the polymer based composite comprises a peel strength of at least about 5 N/in.

Embodiment 42

The polymer composite or method of any one of embodiments 21 and 22, wherein the polymer based composite comprises a thermal conductivity of at least about 1 W/mK.

Embodiment 43

A surface modified boron nitride particle comprising: a boron nitride particle covalently bonded via a urethane moiety to an aromatic compound; and at least two auxiliary moieties.

Embodiment 44

A method of forming a surface modified boron nitride particle, wherein the method comprises: activating a boron nitride particle to form at least one hydroxyl group; chemically reacting an aromatic compound with the at least one hydroxyl group on the boron nitride particle, wherein the aromatic compound comprises at least two auxiliary moieties.

Embodiment 45

The surface modified boron nitride particle or method of any one of embodiments 43 and 44, wherein the boron nitride particle is a hexagonal boron nitride particle.

Embodiment 46

The surface modified boron nitride particle or method of any one of embodiments 43 and 44, wherein a majority of any moieties connecting the boron nitride particle and the aromatic compound are urethane moieties.

Embodiment 47

The surface modified boron nitride particle or method of any one of embodiments 43 and 44, wherein the aromatic compound comprises at least one aromatic ring, at least two aromatic rings, at least three aromatic rings.

Embodiment 48

The surface modified boron nitride particle or method of any one of embodiments 43 and 44, wherein the aromatic compound comprises a phenyl moiety, a biphenyl moiety, a naphthyl moiety, a phenanthryl moiety, a methylene-diphenyl moiety, a triphenyl-methane moiety.

Embodiment 49

The surface modified boron nitride particle or method of any one of embodiments 43 and 44, wherein the at least two auxiliary moieties are amino groups (—NH2), hydroxyl groups (—OH), fluoro groups (—F), chloro groups (—Cl), bromo groups (—Br), iodo groups (—I), carboxyl groups (—COOH), cyano groups (—CN), cyanate groups (—OCN), isocyanate groups (—NCO), thiol groups (—SH), or thioisocyanate groups (—NCS).

Embodiment 50

The surface modified boron nitride particle or method of any one of embodiments 43 and 44, wherein the aromatic compound comprises two isocyanate moieties, three isocyanate moieties, four isocyanate moieties, five isocyanate moieties.

Embodiment 51

An oligomer functionalized boron nitride particle comprising: a boron nitride particle; an aromatic compound covalently bonded via a urethane moiety to the boron nitride particle; and at least two oligomers covalently bonded to the aromatic compound via at least two auxiliary moieties of the aromatic compound.

Embodiment 52

A method of forming an oligomer functionalized boron nitride particle, wherein the method comprises: activating a boron nitride particle to form at least one hydroxyl group; chemically reacting an aromatic compound with the at least one hydroxyl group on the boron nitride particle, wherein the aromatic compound comprises at least two auxiliary moieties; and chemically reacting at least two oligomers covalently bonded to the aromatic compound via the at least two auxiliary moieties.

Embodiment 53

The oligomer functionalized boron nitride particle or method of any one of embodiments 51 and 52, wherein the boron nitride particle is a hexagonal boron nitride particle.

Embodiment 54

The oligomer functionalized boron nitride particle or method of any one of embodiments 51 and 52, wherein a majority of any moieties connecting the boron nitride particle and the aromatic compound are urethane moieties.

Embodiment 55

The oligomer functionalized boron nitride particle or method of any one of embodiments 51 and 52, wherein the aromatic compound comprises at least one aromatic ring, at least two aromatic rings, at least three aromatic rings.

Embodiment 56

The oligomer functionalized boron nitride particle or method of any one of embodiments 51 and 52, wherein the aromatic compound comprises a phenyl moiety, a biphenyl moiety, a naphthyl moiety, a phenanthryl moiety, a methylene-diphenyl moiety, a triphenyl-methane moiety.

Embodiment 57

The oligomer functionalized boron nitride particle or method of any one of embodiments 51 and 52, wherein the at least two auxiliary moieties are amino groups (—NH2), hydroxyl groups (—OH), fluoro groups (—F), chloro groups (—Cl), bromo groups (—Br), iodo groups (—I), carboxyl groups (—COOH), cyano groups (—CN), cyanate groups (—OCN), isocyanate groups (—NCO), thiol groups (—SH), or thioisocyanate groups (—NCS).

Embodiment 58

The oligomer functionalized boron nitride particle or method of any one of embodiments 51 and 52, wherein the aromatic compound comprises two isocyanate moieties, three isocyanate moieties, four isocyanate moieties, five isocyanate moieties.

Embodiment 59

The oligomer functionalized boron nitride particle or method of any one of embodiments 51 and 52, wherein the oligomer components comprises silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole (PBO and PBI), polycarbonate (PC), polyether sulfone (PES), poly ether ether ketone (PEEK), polyetherimide (PEI), polyethylene (PE), polyphenylene oxide (PPO), polyphenylene sulfide (PPS), polysulfone, polypropylene (PP), polystyrene (PS), polyvinyl chloride (PVC), poly(dimethylsiloxane) or a fluoropolymer.

Embodiment 60

The oligomer functionalized boron nitride particle or method of embodiment 59, wherein the fluoro-based oligomers comprises of PTFE, ETFE, FEP, ECTFE or PFA.

Embodiment 61

A polymer based composite comprising: at least one polymer component and a modified boron nitride filler material dispersed within the polymer component, wherein the modified boron nitride filler material comprises: a boron nitride particle; an aromatic compound covalently bonded via a urethane linkage to the boron nitride particle; and at least two oligomer components covalently bonded to the aromatic compound.

Embodiment 62

A method of forming a polymer based composite, wherein the method comprises: combining at least one polymer component with a boron nitride filler material of oligomer functionalized boron nitride particles, wherein each of the oligomer functionalized boron nitride particles comprise: a boron nitride particle; an aromatic compound covalently bonded via a urethane linkage to the boron nitride particle; and at least two oligomer components covalently bonded to the aromatic compound.

Embodiment 63

The polymer composite or method of any one of embodiments 61 and 62, wherein the boron nitride particle is a hexagonal boron nitride particle.

Embodiment 64

The polymer composite or method of any one of embodiments 61 and 62, wherein a majority of any moieties connecting the boron nitride particle and the aromatic compound are urethane moieties.

Embodiment 65

The polymer composite or method of any one of embodiments 61 and 62, wherein the aromatic compound comprises at least one aromatic ring, at least two aromatic rings, at least three aromatic rings.

Embodiment 66

The polymer composite or method of any one of embodiments 61 and 62, wherein the aromatic compound comprises a phenyl moiety, a biphenyl moiety, a naphthyl moiety, a phenanthryl moiety, a methylene-diphenyl moiety, a triphenyl-methane moiety.

Embodiment 67

The polymer composite or method of any one of embodiments 61 and 62, wherein the at least two auxiliary moieties are amino groups (—NH2), hydroxyl groups (—OH), fluoro groups (—F), chloro groups (—Cl), bromo groups (—Br), iodo groups (—I), carboxyl groups (—COOH), cyano groups (—CN), cyanate groups (—OCN), isocyanate groups (—NCO), thiol groups (—SH), or thioisocyanate groups (—NCS).

Embodiment 68

The polymer composite or method of any one of embodiments 61 and 62, wherein the aromatic compound comprises two isocyanate moieties, three isocyanate moieties, four isocyanate moieties, five isocyanate moieties.

Embodiment 69

The polymer composite or method of any one of embodiments 61 and 62, wherein the polymer component comprises silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole (PBO and PBI), polycarbonate (PC), polyether sulfone (PES), poly ether ether ketone (PEEK), polyetherimide (PEI), polyethylene (PE), polyphenylene oxide (PPO), polyphenylene sulfide (PPS), polyether sulfone (PES), polysulfone (PS), polypropylene (PP), polystyrene (PS), polyvinyl chloride (PVC), poly(dimethylsiloxane) or a fluoropolymer.

Embodiment 70

The polymer composite or method of embodiment 69, wherein the fluoro-based polymer comprises PTFE, ETFE, FEP, ECTFE or PFA.

Embodiment 71

The polymer composite or method of any one of embodiments 61 and 62, wherein a monomer unit of the polymer component is from the same family as a monomer unit of the oligomer components.

Embodiment 72

The polymer based composite or method of embodiment 71, wherein a monomer unit of the polymer component is the same as a monomer unit of the oligomer components.

Embodiment 73

The polymer composite or method of any one of embodiments 61 and 62, wherein the polymer component comprises a thermoset polymer or a thermoplastic polymer.

Embodiment 74

The polymer based composite or method of embodiment 73, wherein the polymer component comprises silicone/siloxane, phenolic resin, epoxy resin, poly-butadiene, polyimides, polyester resin, polyurethane, poly(methyl methacrylate) (PMMA), Acrylonitrile butadiene styrene (ABS), polylactic acid, polybenzimaidazole (PBO and PBI), polycarbonate (PC), polyether sulfone (PES), poly ether ether ketone (PEEK), polyetherimide (PEI), polyethylene (PE), polyphenylene oxide (PPO), polyphenylene sulfide (PPS), polyether sulfone (PES), polysulfone (PS), polypropylene (PP), polystyrene (PS), polyvinyl chloride (PVC), poly(dimethylsiloxane) or a fluoropolymer.

Embodiment 75

The polymer composite or method of any one of embodiments 61 and 62, wherein the polymer component comprises phenol formaldehyde resins, Bakelite, Novotext (cotton fibre-reinforced phenolic), Oasis (an open-celled phenolic foam), Maritex Aquarius, poly-butadiene, styrene-butadiene copolymer, Kapton(poly-oxydiphenylene-pyromellitimide), aliphatic polyimides, aromatic polyimides, semiaromatic polyimides, Acrylated saturated/unsaturated aliphatic polyurethane, Polybutadiene rubber blended with nitrile rubber, styrene-butadiene copolymer or UTEM.

Embodiment 76

The polymer composite or method of any one of embodiments 61 and 62, wherein the fluoro-based polymer comprises PTFE, ETFE, FEP, ECTFE or PFA.

Embodiment 77

The polymer composite or method of any one of embodiments 61 and 62, wherein the oligomer components comprises silicone/siloxane, phenolic resin, epoxy resin, polybutadiene, polyimides, polyester resin, polyurethane, poly (methyl methacrylate) (PMMA), Acrylonitrile butadiene styrene (ABS), polylactic acid, polybenzimaidazole, polycarbonate (PC), polyether sulfone (PES), poly ether ether ketone (PEEK), polyetherimide (PEI), polyethylene (PE), polyphenylene oxide (PPO), polyphenylene sulfide (PPS), polypropylene (PP), polystyrene (PS), polyvinyl chloride (PVC), poly(dimethylsiloxane) or a fluoropolymer.

Embodiment 78

The polymer based composite of embodiment 77, wherein the fluoro-based oligomers comprises of PTFE, ETFE or PFA.

Embodiment 79

The polymer composite or method of any one of embodiments 61 and 62, wherein the polymer based composite comprises a peel strength of at least about 10 N/in and a thermal conductivity of at least about 0.2 W/mK.

Embodiment 80

The polymer composite or method of any one of embodiments 61 and 62, wherein the polymer based composite comprises a peel strength of at least about 15 N/in, at least about 20 N/in.

Embodiment 81

The polymer composite or method of any one of embodiments 61 and 62, wherein the polymer based composite comprises a thermal conductivity of at least about 1 W/mK.

EXAMPLES

Example 1

A sample polymer based composite S1 was formed according to embodiments described herein. Specifically, S1 included oligomer functionalized hexagonal boron nitride powder formed according to embodiments described herein and combined in a polybutadiene polymer matrix with a 10% mass ratio of nitride powder to polymer matrix.

For purposes of comparison, two comparison sample composites CS1 and CS2 were formed. Comparison sample composite CS1 included a polybutadiene polymer matrix with no fillers (i.e., no hexagonal boron nitride powder). Comparison sample composite CS2 included non-modified hexagonal boron nitride powder combined in a polybutadiene polymer matrix with a 10% mass ratio of nitride powder to poly matrix.

Peel strength of sample polymer based composite S1, comparison sample composite CS1 and comparison sample composite CS2 was measured and recorded. Peel strength was measured according to IPC standard 2.4.9.

Peel strength measurements are summarized in Table 1 below:

TABLE 1

Peel Strength

| SAMPLE | PEEL STRENGTH (N/in) |
|---|---|
| S1 | 20.1 |
| CS1 | 19.0 |
| CS2 | 14.8 |

Figure 4:
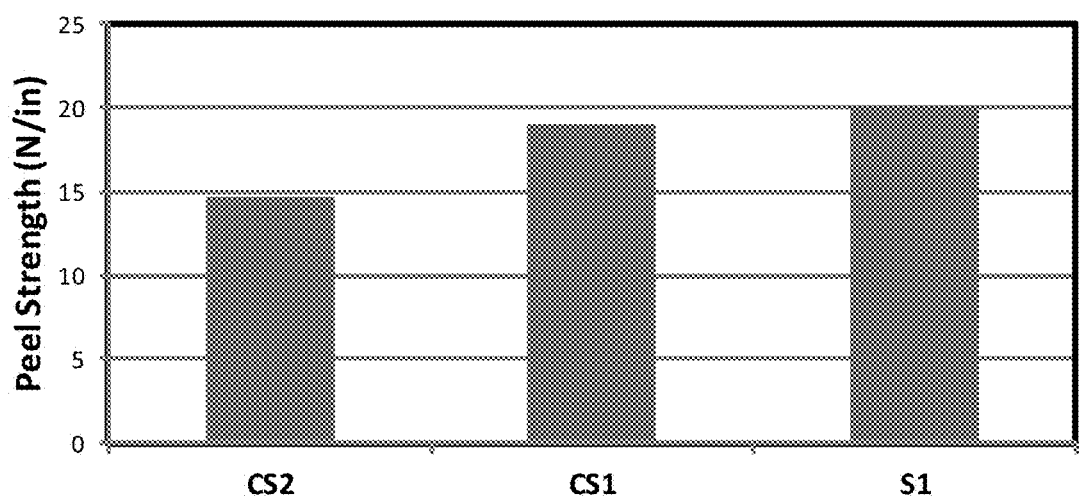
FIG. 4 includes a plot comparing the peel strength of a sample polymer based composite formed according to an embodiment described herein with two comparison sample polymer based composites.

FIG. 4 illustrates a plot of the peel strength for each sample polymer based composite S1, CS1 and CS2.

Example 2

Sample polymer based composites S2-S4 were formed according to embodiments described herein. Specifically, S2 included oligomer functionalized hexagonal boron nitride powder formed according to embodiments described herein and combined in a polybutadiene polymer matrix with a 20% mass ratio of nitride powder to polymer matrix. S3 included oligomer functionalized hexagonal boron nitride powder formed according to embodiments described herein and combined in a polybutadiene polymer matrix with a 30% mass ratio of nitride powder to polymer matrix. S4 included oligomer functionalized hexagonal boron nitride powder formed according to embodiments described herein and combined in a polybutadiene polymer matrix with a 40% mass ratio of nitride powder to polymer matrix.

For purposes of comparison, two comparison sample composites CS3 and CS4 were formed. Comparison sample composite CS3 included a polybutadiene polymer matrix with no fillers (i.e., no hexagonal boron nitride powder). Comparison sample composite CS4 included non-modified hexagonal boron nitride powder combined in a polybutadiene polymer matrix with a 20% mass ratio of nitride powder to poly matrix.

Thermal conductivity of sample polymer based composites S2-S4, comparison sample composite CS3 and comparison sample composite CS4 was measured and recorded. Thermal conductivity was calculated as the product of thermal diffusivity, density and heat capacity. More particularly, through plane thermal conductivity was calculated as the product of the through plane thermal diffusivity, the density and the heat capacity. The thermal diffusivity of each sample was measured according to the standard ASTM C-518 by the thermal flows method. The diffusivity of each sample was measured perpendicularly to the composite polymer layer. The heat capacity of each sample was measured by DSC (differential scanning calorimetry) on a Netzsch thermobalance. The density of each sample was measured by Helium pycnometry.

Thermal conductivity measurements are summarized in Table 2 below:

TABLE 2

Thermal Conductivity

| SAMPLE | THERMAL CONDUCTIVITY (W/mK) |
|---|---|
| CS2 | 0.1 |
| S2 | 0.239 |
| S3 | 0.287 |
| S4 | 0.372 |
| CS4 | 0.129 |

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A surface modified nitride particle comprising:
   a nitride particle covalently bonded via a urethane moiety to an aromatic compound,
   wherein the aromatic compound comprises three isocyanate moieties; and
   wherein at least two of the isocyanate moieties are not bonded to the nitride particle.

2. The surface modified nitride particle of claim 1, wherein the nitride particle is a boron nitride particle or a silicon nitride particle.

3. The surface modified nitride particle of claim 1, wherein the aromatic compound comprises at least one of a phenyl moiety, a biphenyl moiety, a naphthyl moiety, a phenanthryl moiety, a methylene-diphenyl moiety, and a triphenyl-methane moiety.

4. The surface modified nitride particle of claim 1, wherein the aromatic compound comprises a phenyl moiety.

5. The surface modified nitride particle of claim 1, wherein the aromatic compound comprises a biphenyl moiety.

6. The surface modified nitride particle of claim 1, wherein the aromatic compound comprises a naphthyl moiety.

7. The surface modified nitride particle of claim 1, wherein the aromatic compound comprises a phenanthryl moiety.

8. The surface modified nitride particle of claim 1, wherein the aromatic compound comprises a methylene-diphenyl moiety.

9. The surface modified nitride particle of claim 1, wherein the aromatic compound comprises a triphenyl-methane moiety.

10. The surface modified nitride particle of claim 1, wherein the nitride particle is a boron nitride particle.

11. The surface modified nitride particle of claim 1, wherein the nitride particle is a silicon nitride particle.

12. The surface modified nitride particle of claim 1, wherein the aromatic compound comprises four isocyanate moieties.

13. The surface modified nitride particle of claim 1, wherein the aromatic compound comprises five isocyanate moieties.

14. The surface modified nitride particle of claim 3, wherein the nitride particle is a boron nitride particle.

15. The surface modified nitride particle of claim 3, wherein the nitride particle is a silicon nitride particle.

* * * * *